United States Patent
Buet et al.

(10) Patent No.: US 10,689,298 B2
(45) Date of Patent: Jun. 23, 2020

(54) COMPOSITE MATERIAL PART INCLUDING AN INTERPHASE LAYER OF ALUMINUM-DOPED BORON NITRIDE

(71) Applicants: SAFRAN CERAMICS, Le Haillan (FR); CENTRE NATIONAL DE LA RECHERCHE SCIENTIFIQUE, Paris (FR)

(72) Inventors: Emilien Buet, Moissy-Cramayel (FR); Paul Carminati, Merignac (FR); Sylvain Lucien Jacques, Talence (FR); Francis Rebillat, Pessac (FR)

(73) Assignees: SAFRAN CERAMICS, Le Haillan (FR); CENTRE NATIONAL DE LA RECHERCHE SCIENTIFIQUE, Paris (FR)

(*) Notice: Subject to any disclaimer, the term of this patent is extended or adjusted under 35 U.S.C. 154(b) by 0 days.

(21) Appl. No.: 16/464,039

(22) PCT Filed: Nov. 22, 2017

(86) PCT No.: PCT/FR2017/053209
§ 371 (c)(1),
(2) Date: May 24, 2019

(87) PCT Pub. No.: WO2018/096266
PCT Pub. Date: May 31, 2018

(65) Prior Publication Data
US 2019/0382318 A1    Dec. 19, 2019

(30) Foreign Application Priority Data
Nov. 28, 2016 (FR) ..................... 16 61557

(51) Int. Cl.
C04B 35/515 (2006.01)
C04B 35/628 (2006.01)
C04B 35/80 (2006.01)

(52) U.S. Cl.
CPC ...... C04B 35/515 (2013.01); C04B 35/62868 (2013.01); C04B 35/62873 (2013.01);
(Continued)

(58) Field of Classification Search
CPC ........ C04B 2235/402; C04B 2235/614; C04B 2235/75; C04B 35/515; C04B 35/80;
(Continued)

(56) References Cited

U.S. PATENT DOCUMENTS

2008/0299385 A1   12/2008  Philippe et al.
2015/0274979 A1*  10/2015  Lazur .................. C04B 35/565
                                                        428/216

FOREIGN PATENT DOCUMENTS

CN      101128405 A       2/2008
CN      103058697    *    4/2013
(Continued)

OTHER PUBLICATIONS

International Preliminary Report on Patentability and the Written Opinion of the International Searching Authority as issued in International Patent Application No. PCT/FR2017/053209, dated May 28, 2019.
(Continued)

*Primary Examiner* — Camie S Thompson
(74) *Attorney, Agent, or Firm* — Pillsbury Winthrop Shaw Pittman LLP

(57) ABSTRACT

A composite material part includes fiber reinforcement made of carbon or ceramic yarns and a matrix that is mostly ceramic, the part further including a first interphase layer covering the yarns and present between the yarns and the
(Continued)

matrix, the first interphase layer being a layer of boron nitride doped with aluminum and presenting an atom content of aluminum lying in the range 5% to 15%.

14 Claims, 3 Drawing Sheets

(52) U.S. Cl.
CPC ........ *C04B 35/62894* (2013.01); *C04B 35/80* (2013.01); *C04B 2235/402* (2013.01); *C04B 2235/614* (2013.01)

(58) Field of Classification Search
CPC ........ C04B 35/62868; C04B 35/62873; C04B 35/62897; C04B 35/62884; C04B 35/565; C04B 41/4556; C04B 41/87; D06M 11/58; D06M 11/80; C09D 1/00
USPC ............ 428/293.4, 296.4, 299.1, 312.6, 375; 264/626, 640; 156/89.27
See application file for complete search history.

(56) References Cited

FOREIGN PATENT DOCUMENTS

| EP | 2 574 604 A2 | 4/2013 |
|---|---|---|
| WO | WO 2005/092610 A1 | 10/2005 |

OTHER PUBLICATIONS

International Search Report as issued in International Patent Application No. PCT/FR2017/053209, dated Feb. 5, 2018.
Hurwitz, F. I., et al., "Alternative Interphase Coatings for Improved Durability in SiC/SiC Composites," Ceramic Engineering and Science Proceed, American Ceramic Society Inc., vol. 24, No. 4, Jan. 2003, XP008049905, pp. 231-237.

\* cited by examiner

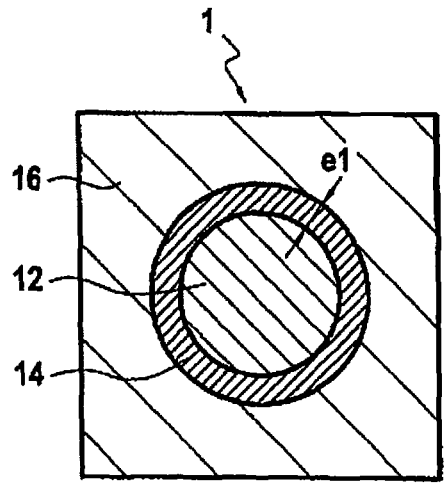
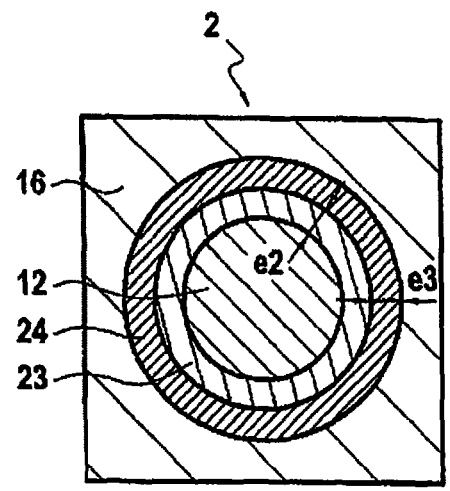
FIG.1     FIG.2
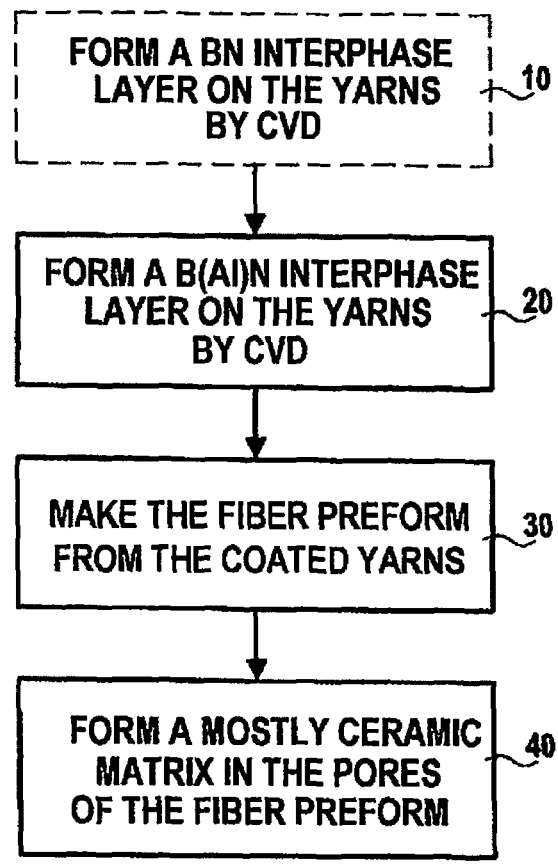
FIG.3

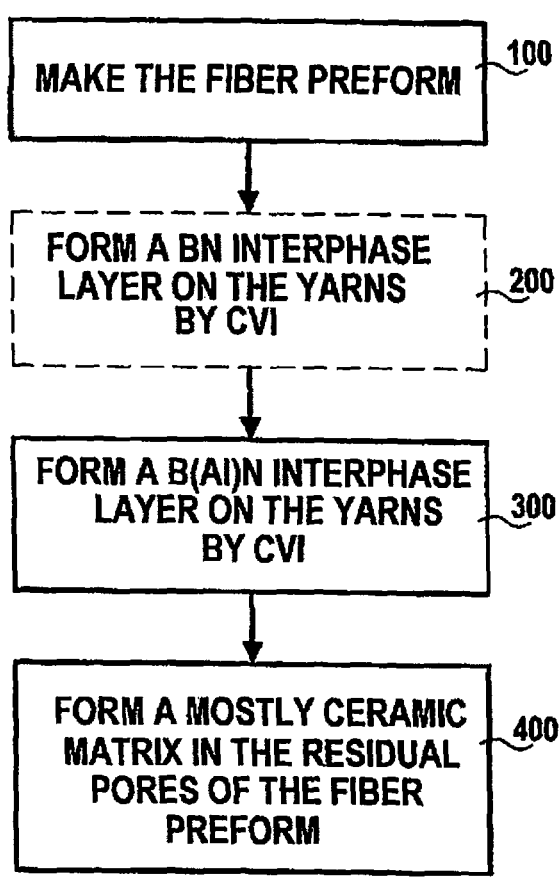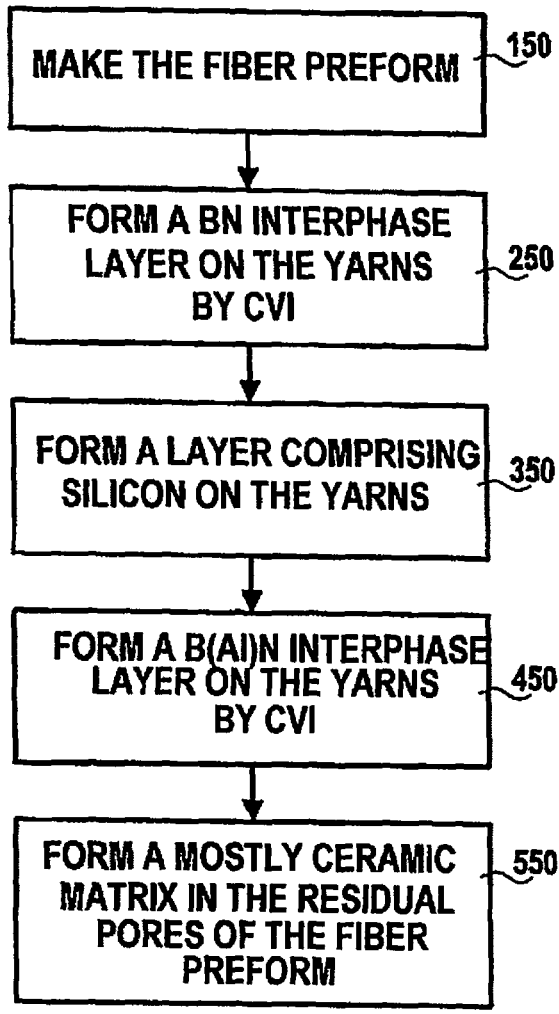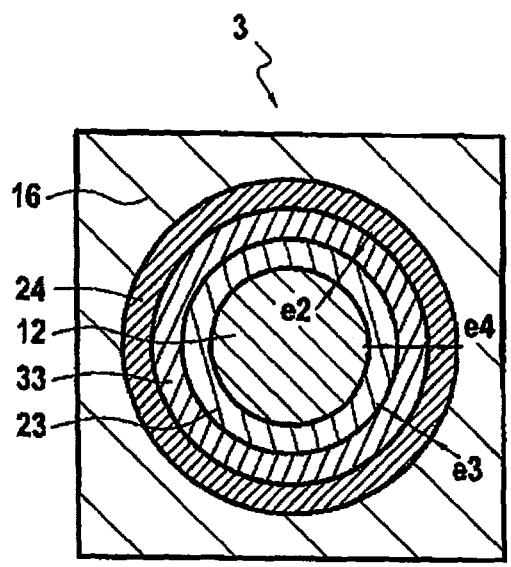

COMPOSITE MATERIAL PART INCLUDING AN INTERPHASE LAYER OF ALUMINUM-DOPED BORON NITRIDE

CROSS-REFERENCE TO RELATED APPLICATIONS

This application is the U.S. National Stage of PCT/FR2017/053209, filed Nov. 22, 2017, which in turn claims priority to French patent application number 1661557 filed Nov. 28, 2016. The content of these applications are incorporated herein by reference in their entireties.

BACKGROUND OF THE INVENTION

The invention relates to a composite material part having a matrix that is mostly ceramic (a ceramic matrix composite (CMC) part), which part includes an interphase layer of aluminum-doped boron nitride interposed between the fiber reinforcement and a mostly ceramic matrix phase.

A field of application of the invention is fabricating composite materials that are useful in fabricating structural parts used in the hot portions of turbine engines, in particular aviation turbine engines, e.g. parts of turbines, of afterbodies, or of secondary nozzles.

CMC parts are known that comprise fiber reinforcement made of silicon carbide (SiC) fibers, an interphase coating of boron nitride (BN) that is present on the yarns, and a matrix that is mostly ceramic.

Fabricating such CMC material parts may include a first step during which a fiber preform of shape close to that of the part that is to be fabricated is obtained by three-dimensionally weaving SiC yarns.

During a second step, the BN interphase coating may be formed on the SiC yarns by chemical vapor infiltration (CVI). During this step, the preform is held in a desired shape by means of tooling or a shaper. The BN interphase may be formed by CVI on the SiC yarns from a reaction gas phase comprising boron trichloride $BCl_3$, ammonia $NH_3$, and dihydrogen $H_2$. By way of example, the CVI process may be performed at a temperature that is relatively low, e.g. about 700° C., and at a pressure that is relatively low, e.g. about 1.3 kilopascals (kPa), in particular in order to obtain a BN interphase that provides relatively strong bonding between the yarns and the interphase. Such strong bonding makes it possible to take advantage of the capacity of SiC yarns to deform elastically in order to obtain a CMC material having a high elastic deformation limit, which is thus less likely to crack under load. The BN interphase acts as a mechanical fuse by enabling cracks that propagate towards the fibers to be deflected, thereby increasing the lifetime of the material.

In a third step, the mostly ceramic matrix is formed in the residual pores of the fiber preform comprising yarns coated by the BN interphase, so as to obtain the CMC material part.

CMC materials are inevitably subjected to cracking, which, even if it does not significantly affect the mechanical properties of the materials, can nevertheless give the surrounding atmosphere access to the core of the material. Cracks or microcracks can exist as from when the material is made, or they can appear while it is in service. Unfortunately, such materials are intended more particularly for applications at high temperature in an oxidizing atmosphere (air), in particular in the fields of aviation and space.

In order to guarantee a good lifetime, it is therefore desirable to form a barrier that prevents the surrounding atmosphere from having a corrosive effect on the fiber reinforcement or on the interphase, since otherwise the mechanical properties of the material become degraded. Boron nitride oxidizes to form a liquid oxide $B_2O_3$, which acts as a diffusion barrier against oxygen. Nevertheless, in the presence of moisture, the liquid $B_2O_3$ oxide vaporizes at high temperature in the form of volatile hydroxides $H_xB_yO_z$. This evaporation leads to consumption by oxidation and corrosion of the boron nitride layer. This can lead to a diminution in the mechanical properties of the material.

The invention seeks to propose a solution for improving the ability of CMC parts to withstand oxidation and corrosion at high temperature.

OBJECT AND SUMMARY OF THE INVENTION

To this end, in a first aspect, the invention provides a composite material part comprising fiber reinforcement made of carbon or ceramic yarns and a matrix that is mostly ceramic, the part further comprising a first interphase layer covering the yarns and present between the yarns and the matrix, said first interphase layer being a layer of boron nitride doped with aluminum and presenting an atom content of aluminum lying in the range 5% to 15%.

Below, the term "B(Al)N interphase layer" or "first interphase layer" is used to designate the above-mentioned first interphase layer made of boron nitride doped with aluminum.

In comparison with an interphase layer of pure BN, the B(Al)N interphase layer presents improved stability in a wet atmosphere at high temperature and reduced sensitivity to phenomena of oxidation and of corrosion. More precisely, the presence of aluminum in the B(Al)N interphase layer at at least 5% in atom percentage leads to this layer having improved resistance to oxidation and also to liquid $B_2O_3$ oxide being retained physico-chemically by forming crystals of compounds defined as $aB_2O_3.bAl_2O_3$ (where a and b are integers) in an atmosphere that is wet and at high temperature. In addition, limiting the atom content of aluminum to no more than 15% in the B(Al)N interphase layer enables that layer to have satisfactory crack-deflecting properties. If the atom content of aluminum in a layer based on boron nitride exceeds 15%, then that layer no longer performs its crack-deflecting function and the lifetime of the material incorporating it is degraded. The invention thus provides CMC parts that present improved lifetime at high temperature in a medium that is oxidizing and wet.

In an embodiment, the first interphase layer may be in contact with the yarns.

In a variant, the part further comprises a second interphase layer of boron nitride situated between the yarns and the first interphase layer. In particular, under such circumstances, the first interphase layer may be in contact with the second interphase layer.

In an embodiment, the part may include a layer comprising silicon in contact with the first interphase layer.

The presence of a layer comprising silicon in contact with the B(Al)N interphase layer serves advantageously to still further stabilize the $B_2O_3$ glass by adding silicon so as to form a borosilicate glass, thereby still further improving the ability of the part to withstand oxidation and corrosion at high temperature.

In particular, said layer comprising silicon may be present between the yarns and the first interphase layer. In a variant, or in combination, the matrix may present a proportion that includes silicon in contact with the first interphase layer.

In an embodiment, the first interphase layer presents an atom content of aluminum lying in the range 5% to 12%. In particular, the first interphase layer may present an atom content of aluminum lying in the range 7% to 12%.

The present invention also provides a method of fabricating a part as described above, the method comprising at least the following steps:
- forming the first interphase layer on the yarns;
- making a fiber preform forming the fiber reinforcement of the part that is to be obtained out of the yarns by performing one or more textile operations; and
- forming a matrix mostly of ceramic in the pores of the fiber preform on the first interphase layer.

In an implementation, the first interphase layer is formed on the yarns by chemical vapor infiltration or deposition. In particular, the first interphase layer may be made from a reaction gas phase comprising boron trichloride $BCl_3$, ammonia $NH_3$, and a precursor gas including aluminum. By way of example, the precursor gas including aluminum may be selected from:
trimethylaluminum, aluminum trichloride, aluminum acetylacetonate, aluminum isopropoxide, aluminum ethoxide, and mixtures thereof.

The present invention also provides a method of using a part as described above, the method comprising a step of using said part at a temperature higher than or equal to 800° C. in a medium that is oxidizing and wet.

BRIEF DESCRIPTION OF THE DRAWINGS

Other characteristics and advantages of the invention appear from the following description, given in non-limiting manner and with reference to the accompanying drawings, in which:

FIG. 1 is a diagrammatic and fragmentary view in section of a first example of a part of the invention;

FIG. 2 is a diagrammatic and fragmentary view in section of a second example of a part of the invention;

FIGS. 3 and 4 are flow charts showing successions of steps for fabricating the parts shown in FIGS. 1 and 2;

FIG. 5 is a diagrammatic and fragmentary view in section of a third example of a part of the invention;

FIG. 6 is a flow chart showing a succession of steps enabling the part shown in FIG. 5 to be fabricated.

DETAILED DESCRIPTION OF EMBODIMENTS

Figure 7:
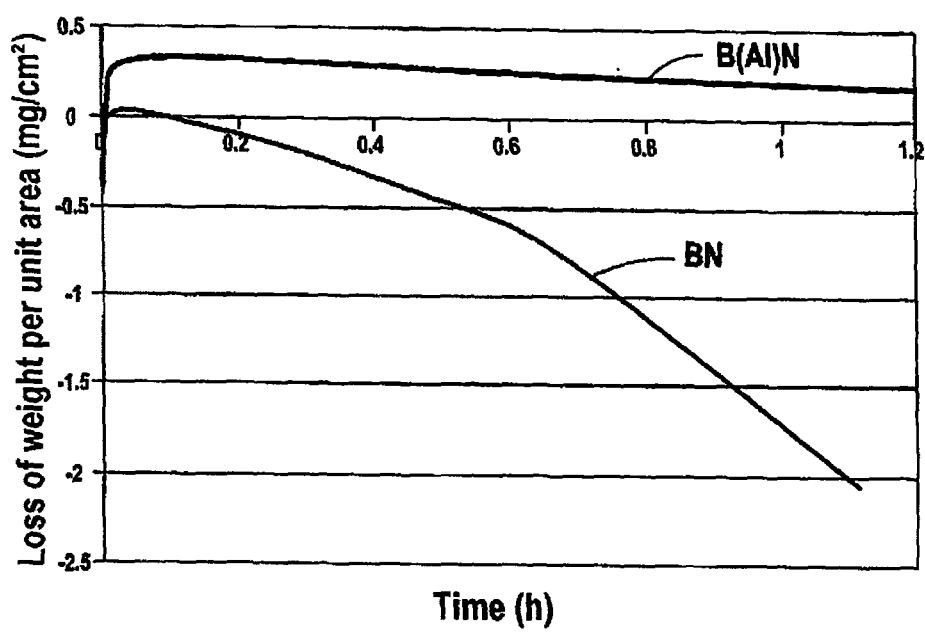
FIG. 7 shows the result of a corrosion test comparing the ability of a BN interphase to withstand corrosion with the corresponding ability of a B(Al)N interphase.

FIG. 1 shows a first example of a part 1 of the invention.

The part 1 comprises fiber reinforcement comprising a plurality of yarns 12 made of carbon or of ceramic. By way of example, it is possible to use silicon carbide yarns supplied by the supplier NGS under the reference "Nicalon", "Hi-Nicalon", or indeed "Hi-Nicalon Type S". By way of example, usable carbon yarns are supplied under the name Torayca T300 3K by the supplier Toray.

In the example shown, the part 1 has a B(Al)N interphase layer 14. In this example, the B(Al)N interphase layer 14, as a result of its limited content of aluminum, performs a function of embrittlement relief in the composite material, which function helps deflect any cracks reaching the interphase after propagating through the matrix, thereby preventing or retarding any rupturing of the yarns by such cracks. The B(Al)N interphase layer 14 also presents improved stability under a wet atmosphere at high temperature and lower sensitivity to phenomena of oxidation and of corrosion compared with an interphase layer made of pure BN, thus giving the part 1 a better lifetime in operation. As mentioned, the presence of aluminum in the B(Al)N interphase layer leads to an improvement in the resistance of this layer to oxidation and also to the liquid $B_2O_3$ oxide being retained physico-chemically by forming crystals of compounds defined as $aB_2O_3.bAl_2O_3$ under a wet atmosphere at high temperature. In particular, the presence of aluminum enables two defined compounds, namely $2Al_2O_3.B_2O_3$ and $9Al_2O_3.2B_2O_3$ to be formed. Aluminum borate $2Al_2O_3.B_2O_3$ presents good ability to withstand corrosion by moisture, much better than that of $B_2O_3$, at temperatures that are high, i.e. above 400° C. and up to decomposing at 1189° C. This decomposition gives rise to forming the second defined compound $9Al_2O_3.2B_2O_3$ with liquid $B_2O_3$ being released that contributes to healing at higher temperature. Aluminum borate $9Al_2O_3.2B_2O_3$ decomposes at above 1900° C.

In the example shown, the part 1 presents a single layer interphase formed by the B(Al)N interphase layer 14. In the part 1, the B(Al)N interphase layer 14 is present in contact with the yarns 12. By way of example, the thickness $e_1$ of the B(Al)N interphase layer 14 may lie in the range 10 nanometers (nm) to 2000 nm, e.g. in the range 100 nm to 2000 nm, or even 100 nm to 1000 nm.

As mentioned above, the B(Al)N interphase layer 14 is a layer of boron nitride doped by aluminum in the range 5% to 15% in atom percentage. In particular, the atom content of aluminum in the B(Al)N interphase layer may lie in the range 5% to 14%, or indeed 5% to 13%, or 5% to 12%, or 5% to 11%, or 5% to 10%, or 5% to 9%. The atom content of aluminum in the B(Al)N interphase layer may also lie in the range 6% to 15%, or indeed 6% to 14%, or 6% to 13%, or 6% to 12%, or 6% to 11%, or 6% to 10%, or 6% to 9%. The atom content of aluminum in the B(Al)N interphase layer may also lie in the range 7% to 15%, or indeed 7% to 14%, or 7% to 13%, or 7% to 12%, or 7% to 11%, or 7% to 10%, or 7% to 9%. The atom content of aluminum in the B(Al)N interphase layer may also lie in the range 8% to 15%, or indeed 8% to 14%, or 8% to 13%, or 8% to 12%, or 8% to 11%, or 8% to 10%, or 8% to 9%. Ignoring inevitable purities, the B(Al)N interphase layer 14 may be constituted by boron, nitrogen, and aluminum, with an atom content of aluminum as specified above. In particular, the B(Al)N interphase layer 14 may be free from any carbon or silicon. The above-described characteristics relating to the composition B(Al)N interphase layer may apply to all of the embodiments of the part of the invention, and not only to the embodiment shown in FIG. 1.

In addition, the part 1 presents a matrix 16 that is mostly of ceramic, in particular of refractory carbide, oxide, or nitride. The term "matrix that is mostly of ceramic" should be understood as meaning that the content by weight of ceramic material in the matrix is greater than or equal to 50%. The matrix 16 densifies the fiber reinforcement by being present in the pores therein. The matrix 16 covers the fibers 12 and the interphase 14. The matrix 16 may occupy the majority (i.e. at least 50%), or indeed at least 75%, of the volume of the accessible pores of the fiber reinforcement. In the example shown, the matrix 16 is present in contact with the B(Al)N interphase layer 14.

By way of example, the matrix 16 may be of silicon carbide. In a variant, the matrix 16 may comprise at least a first layer of ceramic material and at least a second layer of crack-deflecting material, such as pyrolytic carbon (PyC), boron-doped carbon (BC, with boron at an atom proportion lying in the range 5% to 20%, the complement being carbon), or boron nitride. In a variant, the matrix 16 may be a sequenced matrix comprising ceramic layers alternating with crack-deflecting material. The ceramic layers may be made of SiC, or of a ternary Si—B—C system, or indeed of boron carbide $B_4C$.

FIG. 2 shows a second embodiment of a part 2 of the invention.

In this embodiment, the part 2 comprises a multilayer interphase coating made up in combination of the first interphase layer 24 and of a second interphase layer 23. In the embodiment shown, the part 2 has a second interphase layer 23 made of boron nitride. The second interphase layer 23 is present in contact with the yarns 12. By way of example, the thickness $e_2$ of the second interphase layer 23 may lie in the range 10 nm to 2000 nm, e.g. in the range 100 nm to 2000 nm, or even 100 nm to 1000 nm. The second interphase layer 23 is coated by the B(Al)N first interphase layer 24. In the embodiment shown, the B(Al)N interphase layer 24 is present in contact with the BN interphase layer 23. By way of example, the thickness $e_3$ of the B(Al)N first interphase layer 24 may lie in the range 10 nm to 1000 nm, e.g. in the range 10 nm to 100 nm. The thickness $e_3$ of the B(Al)N first interphase layer 24 may be greater than or equal to the thickness $e_2$ of the second interphase layer 23. The matrix 16 made mostly of ceramic covers the layers 23 and 24. The matrix 16 may be as described above.

In a variant, there could be at least one third layer interposed between the BN second interphase layer and the B(Al)N first interphase layer, as described further below. There follows a description with reference to FIGS. 3 and 4 of two methods of fabrication suitable for use in making the parts of FIGS. 1 and 2.

With reference to FIG. 3 and in known manner, it is possible initially to make a first boron nitride interphase layer by chemical vapor deposition (CVD) on ceramic or carbon yarns (step 10). Under such circumstances, a plurality of yarns that are not mutually bonded together, i.e. that have not been subjected to a textile operation for forming a fiber structure, in particular yarns that have not been woven, knitted, or braided, are caused to travel through a reaction chamber and a gas phase is inserted into the reaction chamber. The gas phase is inserted into the reaction chamber while the yarns are traveling continuously at a non-zero speed through the chamber in order to form a boron nitride interphase by CVD. Systems enabling an interphase layer to be deposited by CVD continuously on moving yarns are known. By way of example, mention may be made of systems similar to that described in patent FR 86/17157. The gas phase used for depositing boron nitride is itself known, and for example it is possible to use a $BCl_3/NH_3$ system. Nevertheless, the step 10 is an optional step, and if it is performed, it leads to forming a part 2 having the structure as shown in FIG. 2, which figure shows a first interphase layer 23 made of boron nitride.

The step 20 consists in depositing the B(Al)N interphase layer 14 or 24 on the yarns 12, possibly already coated in the BN first interphase layer 23. In the example of FIG. 3, the B(Al)N interphase layer is formed by CVD while the yarns are traveling continuously through the reaction chamber, as mentioned above.

The B(Al)N interphase layer 14 or 24 may be formed by inserting a gas phase into the reaction chamber, which gas phase comprises $BCl_3$, $NH_3$, and a precursor gas including aluminum. By way of example, the precursor gas including aluminum is selected from: trimethylaluminum, aluminum trichloride, aluminum acetylacetonate, aluminum isopropoxide, aluminum ethoxide, and mixtures thereof. The precursor gas including aluminum may be trimethylaluminum or aluminum trichloride. The gas phase that is inserted may also include a diluant gas, e.g. selected from: argon, dinitrogen, dihydrogen, or helium.

The temperature in the reaction chamber during formation of the B(Al)N interphase layer may for example be higher than or equal to 800° C., or even 1000° C. By way of example, this temperature may be selected to lie in the range 800° C. to 1400° C., or indeed in the range 1000° C. to 1400° C.

By way of example, the pressure in the reaction chamber during formation of the B(Al)N interphase layer may lie in the range 0.1 kPa to 5 kPa.

The B(Al)N interphase layer may be formed by imposing the following operating conditions relating to the rate with which gases are inserted into the reaction chamber:
ratio of [the rate of insertion of $BCl_3$] divided by [the rate of insertion of the precursor gas including aluminum] lying in the range 2 to 5;
ratio of [the rate of insertion of $NH_3$] divided by [the rate of insertion of $BCl_3$] lying in the range 1 to 15; and
ratio of [the rate of insertion of $NH_3$] divided by [the rate of insertion of the precursor gas including aluminum] lying in the range 1 to 50.

When a diluant gas is used, it is possible to prepare a gas phase presenting a ratio of [the flow rate of diluant gas inserted into the reaction chamber] divided by [the flow rate of $BCl_3$+the flow rate of $NH_3$+the flow rate of precursor gas including aluminum as inserted into the reaction chamber] lying in the range 1 to 10.

By way of example, it is possible to form the B(Al)N interphase layer by using the following operating conditions:
temperature in the reaction chamber: 1200° C.;
pressure in the reaction chamber: 0.2 kPa;
trimethylaluminum used as the precursor gas including aluminum;
ratio of [the flow rate $BCl_3$ is inserted] divided by [the flow rate of the precursor gas including aluminum is inserted] equal to 3;
ratio of the [the flow rate $NH_3$ is inserted] divided by [the flow rate $BCl_3$ is inserted] equal to 10;
ratio of the [the flow rate $NH_3$ is inserted] divided by [the flow rate of the precursor gas including aluminum is inserted] equal to 30; and
transit time of the gas phase in the reaction chamber less than 10 milliseconds (ms), e.g. about 8 ms.

Using the above-described operating conditions has enabled an aluminum-doped boron nitride interphase layer to be made having an aluminum atom content of 9%.

FIG. 7 shows the result of a corrosion test showing that the interphase layer made of boron nitride that is not doped with aluminum is consumed much more quickly than is the B(Al)N interphase layer. The inventors have measured a rate of consumption of the BN layer of about 6 micrometers per hour (μm/h) and a rate of consumption of the B(Al)N layer that is much slower, being about 1 μm/h. The B(Al)N layer thus presents improved resistance to oxidation and to corrosion.

Thereafter, in the example of FIG. 3, a fiber preform is made from the yarns coated by the B(Al)N interphase layer (step 30). The fiber preform is obtained from at least one textile operation using the yarns coated in the B(Al)N interphase layer. The fiber preform is intended to constitute the fiber reinforcement of the part that is to be obtained. In particular, the fiber preform may be obtained by multilayer or three-dimensional weaving of the coated yarns.

The term "three-dimensional" weaving or "3D weaving" should be understood as designating a weaving technique in which at least some of the warp yarns interlink weft yarns over a plurality of weft layers. The roles of warp and weft may be interchanged in the present text and should be considered as being covered likewise by the claims.

By way of example, the fiber preform may present a multi-satin weave, i.e. a fabric obtained by three-dimensional weaving with a plurality of weft yarns having a base weave in each layer that is equivalent to a conventional satin type weave, but with certain points of the weave interlinking layers of weft yarns. In a variant, the fiber preform may present an interlock weave. The term "interlock weave or fabric" should be understood as a 3D weave in which each layer of warp yarns interlinks a plurality of layers of weft yarns with all of the yarns in the same warp column having the same movement in the weave plane. Various multilayer weaving techniques suitable for use in forming the fiber preform are described in Document WO 2006/136755.

It is also possible to begin by forming fiber textures such as two-dimensional fabric or unidirectional sheets, and to obtain the fiber preform by draping such fiber textures on a former. The textures may optionally be bonded together, e.g. by stitching or by implanting yarns in order to form the fiber preform.

Once the fiber preform has been obtained it should then be placed in a reaction chamber of a CVI installation in order to form a matrix mostly out of ceramic in the pores of the fiber preform (step 40). It is possible to use a CVI installation of the type described in FIG. 2 of Document WO 96/30317 by adapting the natures of the precursor gases used and the number of sources for such precursor gases. It is possible to perform CVI in conventional manner to make a matrix out of silicon carbide or a matrix that is sequenced, as mentioned above. In a variant, the matrix may be made by a liquid technique (impregnating with a matrix-precursor resin and transforming the resin by curing and pyrolysis, which process can be repeated), or by infiltrating with silicon in the molten state, a method known as "melt-infiltration".

FIG. 4 shows the situation in which the fiber preform is made first (step 100) prior to depositing the B(Al)N first interphase layer. As mentioned above, it is possible during the optional step 200 to deposit a BN interphase layer. The method comprises depositing a B(Al)N interphase layer by CVI using the same operating conditions as those set out above for CVD (step 300). Finally, a matrix that is mostly made of ceramic is made in the residual pores of the fiber preform in the manner described above (step 400).

FIG. 5 shows a third embodiment of a part 3 of the invention. In this configuration, the part 3 includes an intermediate layer 33 comprising silicon that is in contact with the first interphase layer 24. As mentioned above, the presence of a layer comprising silicon in contact with the B(Al)N interphase layer advantageously serves to further stabilize the $B_2O_3$ glass by forming a borosilicate glass. By way of example, the layer 33 may be a layer of a ceramic material. By way of example, the layer 33 may be made of silicon carbide, of silicon nitride, or of Si—B—C. The thickness $e_4$ of the layer 33 may be less than or equal to the thickness $e_3$ and/or the thickness $e_2$. By way of example, the thickness $e_4$ of the layer 33 may be greater than or equal to 100 nm, e.g. lying in the range 100 nm to 500 nm.

FIG. 6 is a flow chart showing a succession of possible steps for making the part 3 shown in FIG. 5. Firstly a fiber preform is made (step 150), and then a BN interphase layer is formed on the yarns by CVI (step 250). Thereafter, the intermediate layer 33 comprising silicon is formed on the BN interphase layer that has been formed (step 350). This intermediate layer may be formed by chemical vapor infiltration. In a variant, the intermediate layer may be formed by chemical vapor deposition if it is formed on the yarns before making the fiber preform. Fabrication of the part continues by forming the B(Al)N interphase layer on the intermediate layer (step 450) and then by forming a mostly ceramic matrix in the residual pores of the preform (step 550).

The above description relates to an intermediate layer 33 that includes silicon being present between the first interphase layer 24 and the second interphase layer 23. In a variant, it is possible to have a configuration without the second interphase layer 23, of the type described in FIG. 1, and presenting an intermediate layer including silicon in contact with the yarns 12 and with the first interphase layer 14. Thus, even in the absence of the intermediate layer comprising silicon, the additional stabilization of $B_2O_3$ by adding silicon can be imparted by a portion of the matrix 16 that includes silicon and that is in contact with the first interphase layer.

Once the part 1, 2, or 3 has been fabricated, it can be used at a temperature higher than or equal to 800° C. in an atmosphere that is oxidizing and wet. In particular, it can be used at a temperature lying in the range 800° C. to 1400° C. In particular, the part 1, 2, or 3 may be used in wet air.

The part 1, 2, or 3 as fabricated in this way may be a part for an aviation of aerospace application. The part may be a hot part of a gas turbine in an aviation or aerospace engine or in an industrial turbine. The part may be a turbomachine part. The part may constitute at least a portion of a guide vane nozzle, at least a portion of a propelling nozzle, or of a thermal protection coating, a wall of a combustion chamber, a turbine ring sector, or a turbomachine blade.

The term "lying in the range . . . to . . . " should be understood as including the bounds.

The invention claimed is:

1. A composite material part comprising fiber reinforcement made of carbon or ceramic yarns and a matrix that is mostly ceramic, the part further comprising a first interphase layer covering the yarns and present between the yarns and the matrix, said first interphase layer being a layer of boron nitride doped with aluminum and presenting an atom content of aluminum lying in the range 5% to 15%, in order for said first interphase layer to chemically retain liquid $B_2O_3$ oxide by forming crystals of compounds defined as $aB_2O_3.bAl_2O_3$ where a and b are integers in an atmosphere that is wet and at high temperature.

2. A part according to claim 1, wherein the first interphase layer presents an atom content of aluminum lying in the range 5% to 12%.

3. A part according to claim 2, wherein the first interphase layer presents an atom content of aluminum lying in the range 7% to 12%.

4. A part according to claim 1, wherein the first interphase layer is in contact with the yarns.

5. A part according to claim 1, wherein the part further comprises a second interphase layer of boron nitride situated between the yarns and the first interphase layer.

6. A part according to claim 5, wherein the first interphase layer is in contact with the second interphase layer.

7. A part according to claim 1, wherein the part includes a layer comprising silicon in contact with the first interphase layer.

8. A part according to claim 7, wherein the layer including silicon is present between the yarns and the first interphase layer.

9. A method of fabricating a part according to claim 1, the method comprising:

forming the first interphase layer on the yarns making a fiber preform forming the fiber reinforcement of the part that is to be obtained out of the yarns by performing one or more textile operations; and forming a matrix mostly of ceramic in the pores of the fiber preform on the first interphase layer.

10. A method according to claim 9, wherein the first interphase layer is formed on the yarns by chemical vapor infiltration or deposition.

11. A method according to claim 10, wherein the first interphase layer is made from a reaction gas phase comprising boron trichloride $BCl_3$, ammonia $NH_3$, and a precursor gas including aluminum.

12. A method according to claim 11, wherein the precursor gas including aluminum is selected from: trimethylaluminum, aluminum trichloride, aluminum acetylacetonate, aluminum isopropoxide, aluminum ethoxide, and mixtures thereof.

13. A method according to claim 11, wherein the precursor gas including aluminum comprises trimethylaluminum.

14. A method of using a part according to claim 1, the method comprising using said part at a temperature higher than or equal to 800° C. in a medium that is oxidizing and wet.

* * * * *